United States Patent
Levitt et al.

(10) Patent No.: US 9,939,551 B2
(45) Date of Patent: Apr. 10, 2018

(54) SYSTEMS, DEVICES AND METHODS FOR BOREHOLE GRAVIMETRY

(71) Applicant: SCHLUMBERGER TECHNOLOGY CORPORATION, Sugar Land, TX (US)

(72) Inventors: Benjamin Levitt, Boston, MA (US); Martin E. Poitzsch, Derry, NH (US); Bradley Albert Roscoe, West Chesterfield, NH (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 525 days.

(21) Appl. No.: 13/966,111

(22) Filed: Aug. 13, 2013

(65) Prior Publication Data

US 2014/0083186 A1  Mar. 27, 2014

Related U.S. Application Data

(60) Provisional application No. 61/705,021, filed on Sep. 24, 2012.

(51) Int. Cl.
*G01D 5/30* (2006.01)
*G01V 7/04* (2006.01)
(Continued)

(52) U.S. Cl.
CPC .............. *G01V 7/00* (2013.01); *E21B 47/00* (2013.01); *G01D 5/30* (2013.01); *G01H 9/00* (2013.01); *G01V 7/04* (2013.01)

(58) Field of Classification Search
CPC .......... G01L 9/0079; G01V 7/00; G01V 7/16; G01V 11/00; G01V 13/00; G01V 7/04;
(Continued)

(56) References Cited

U.S. PATENT DOCUMENTS 3,976,379 A * 8/1976 Morokuma ........ G01B 9/02003
356/487
4,428,234 A * 1/1984 Walker ................. G01P 15/093
73/514.27
(Continued)

FOREIGN PATENT DOCUMENTS

WO   2011097111   8/2011

OTHER PUBLICATIONS

Ashkin, "Acceleration and Trapping of Particles by Radiation Pressure," Physical Review Letters, 1970, vol. 24)4): pp. 156-159.
(Continued)

*Primary Examiner* — Randy Gibson
*Assistant Examiner* — Gedeon M Kidanu

(57) ABSTRACT

A gravimeter, a gravimeter system, and a method for measuring gravitational acceleration within a borehole are described herein. The gravimeter includes a proof mass that is constrained by springs and an optical interferometer for measuring displacement of the proof mass. The optical interferometer generates a light path from a light source to a reflective surface on the proof mass. Spatial displacement of the proof mass from a reference position to a position of gravitational equilibrium is determined by measuring a change in length of the light path. In turn, gravitational acceleration can be determined from the spatial displacement of the proof mass. A number of such gravimeters can be used in a gravimeter system to make measurements of gravitational acceleration in variety of different directions.

29 Claims, 9 Drawing Sheets

(51) Int. Cl.
*E21B 47/00* (2012.01)
*G01V 7/00* (2006.01)
*G01H 9/00* (2006.01)

(58) Field of Classification Search
CPC .......... G01V 7/08; G01V 7/14; G01P 15/093; G01P 15/097; G01B 11/02; G01B 9/02022; G01B 9/02023; G01B 2290/45; G01B 2290/25; E21B 47/00; E21B 47/04; G01D 5/30; G01H 9/00
See application file for complete search history.

(56) References Cited

U.S. PATENT DOCUMENTS

| | | | |
|---|---|---|---|
| 4,652,547 | A | 3/1987 | Chance et al. |
| 6,079,267 | A | 6/2000 | Hull |
| 6,473,187 | B1 * | 10/2002 | Manalis ................ G01P 15/093 356/521 |
| 6,612,171 | B1 | 9/2003 | Stephenson et al. |
| 6,671,057 | B2 | 12/2003 | Orban |
| 7,355,723 | B2 | 4/2008 | Carr |
| 7,359,067 | B2 | 4/2008 | Carr |
| 7,495,775 | B2 | 2/2009 | Carr |
| 7,551,295 | B2 | 6/2009 | Carr et al. |
| 7,554,674 | B2 | 6/2009 | Carr |
| 7,583,390 | B2 | 9/2009 | Carr |
| 7,626,707 | B2 | 12/2009 | Carr |
| 7,707,883 | B2 * | 5/2010 | DiFoggio ................ E21B 47/00 73/152.59 |
| 7,728,983 | B2 | 6/2010 | Ostrovsky et al. |
| 7,793,543 | B2 * | 9/2010 | Csutak .................... E21B 47/04 356/482 |
| 8,007,609 | B2 | 8/2011 | Carr et al. |
| 8,026,714 | B2 | 9/2011 | Carr |
| 2006/0290943 | A1 * | 12/2006 | Sun .................... G01B 9/02021 356/498 |
| 2009/0044618 | A1 * | 2/2009 | DiFoggio ................ E21B 47/04 73/152.59 |
| 2009/0114013 | A1 * | 5/2009 | DiFoggio ................ E21B 47/00 73/382 R |
| 2009/0126486 | A1 * | 5/2009 | Georgi ..................... G01V 7/16 73/382 R |
| 2009/0235740 | A1 | 9/2009 | Carr |
| 2009/0268211 | A1 | 10/2009 | Carr et al. |
| 2010/0286967 | A1 | 11/2010 | Vasilevskiy et al. |
| 2010/0299102 | A1 | 11/2010 | Hall et al. |
| 2011/0196636 | A1 | 8/2011 | Edwards |
| 2012/0247213 | A1 * | 10/2012 | Zumberge ................ G01H 9/00 73/653 |

OTHER PUBLICATIONS

Bertolini et al., "A sapphire monolithic differential accelerometer as core sensor for gravity gradiometric geophysical instrumentation," Annals of Geophysics, Aug./Oct. 2006, vol. 49(4/5): pp. 1095-1103.
Ellis et al., "Chapter 12: Gamma Ray Scattering and Absorption Measurements," Well Logging for Earth Scientists, Second Edition, Springer Science + Business Media B.V.: the Netherlands, 2008: pp. 289-293.
Golden et al., "Description of and Results from a Novel Borehole Gravity Gradiometer," ASEG, Australia, 2007: pp. 1-3.
La Coste, "The zero-length spring gravity meter," Geophysics, Jul. 1988: pp. 20-21.
McGuirk et al., "Sensitive absolute-gravity gradiometry using atom interferometry," Physical Review A, 2002, vol. 65: pp. 033608-1-033608-14.
Niebauer et al., "A new generation of absolute gravimeters," Metrologia, 1995, vol. 32: pp. 159-180.
Peeters, "Design of a Sliding-Weight Borehole Gravimeter to Measure Rock Density in Highly Deviated and Narrow Boreholes," Petrophysics, Apr. 2009: pp. 96-101.
Torge, "2.3: Geometry of the Gravity Field," Gravimetry, Walter de Gruyter & Co.: Berlin, 1989: pp. 31-34.

* cited by examiner

SYSTEMS, DEVICES AND METHODS FOR BOREHOLE GRAVIMETRY

PRIORITY

This application claims the benefit of U.S. Provisional Patent Application Ser. No. 61/705,021 filed Sep. 24, 2012, which is incorporated herein by reference in its entirety.

TECHNICAL FIELD

This disclosure relates to gravimetry and more particularly to borehole gravimetry.

BACKGROUND

Gravimetry can be used to identify hydrocarbon reservoirs within underground formations and to characterize those hydrocarbon reservoirs on a large-scale. In particular, a device called a "gravimeter" can be used to determine a measure of gravitational acceleration at a particular location adjacent to an underground formation. This measure of gravitational acceleration can be used to determine characteristics of the underground formation, such as the bulk density or specific gravity of the underground formation.

One example of a conventional gravimeter is a Lacoste-Romberg gravimeter. A Lacoste-Romberg gravimeter uses a zero-length spring to monitor gravitational force that is applied to a small proof mass. Conventional gravimeters also use other technologies. For example, other conventional gravimeters use the time of flight of a free-falling object or the oscillation time of a pendulum to determine gravitational acceleration. In yet other examples, gravimeters use cold atomic fountains, current-carrying vibrating strings, or torsion balances to determine the force of gravity.

Such conventional gravimeters and other available gravimeters are difficult to adapt to rugged borehole environments. High temperatures and dynamic temperatures are common in borehole environments (e.g., 175° C. and above). Furthermore, tools that enter borehole environments are often subject to shock and vibrations. These problems are compounded because the gravitational force is an extremely weak force. Such conditions make it challenging to achieve the sensitivities for an accurate gravimetric measurement.

SUMMARY

Illustrative embodiments of the present disclosure are directed to a method for measuring gravitational acceleration. The method includes locating a gravimeter within a borehole. The gravimeter includes a proof mass that is constrained by a spring. A light path is generated from a light source to a reflective surface on the proof mass. Spatial displacement of the proof mass from a reference position to a position of gravitational equilibrium is determined by measuring a change in length of the light path.

Various embodiments of the present disclosure are also directed to a gravimeter for borehole applications. The gravimeter includes a proof mass that is constrained by a spring and that is displaceable in response to gravitational acceleration. The gravimeter also includes an optical interferometer for measuring displacement of the proof mass. The optical interferometer is configured to generate a light path from a light source to a reflective surface on the proof mass. A processor is in electronic communication with the optical interferometer. The processor determines spatial displacement of the proof mass from a reference position to a position of gravitational equilibrium by measuring a change in length of the light path. In some embodiments, the processor also determines gravitational acceleration based upon the spatial displacement.

Illustrative embodiments of the present disclosure are also directed to a borehole logging tool. The tool includes a first set of gravimeters and a second set of gravimeters. Each set of gravimeters includes a number of gravimeters oriented to detect gravitational acceleration in at least two different directions. The first set of gravimeters and the second set of gravimeters are spaced apart from each other by a known distance. In some embodiments, a processor determines a formation density at a location based upon a first gravitational acceleration measurement at the first set of gravimeters and a second gravitational acceleration measurement at the second set of gravimeters.

Various embodiments of the present disclosure are also directed to a method for determining a characteristic of a formation. The method includes using a first set of gravimeters to perform a first set of measurements that includes gravitational acceleration in at least two different directions at a first position within a borehole. The method also includes using a second set of gravimeters to perform a second set of measurements that includes gravitational acceleration in at least two different directions at a second position within the borehole. The first position and second position are spaced apart from each other by a known distance. A density at a location within the formation is determined based upon the first set of measurements and the second set of measurements.

BRIEF DESCRIPTION OF THE DRAWINGS

Those skilled in the art should more fully appreciate advantages of various embodiments of the disclosure from the following "Description of Illustrative Embodiments," discussed with reference to the drawings summarized immediately below.

DESCRIPTION OF ILLUSTRATIVE EMBODIMENTS

Illustrative embodiments of the present disclosure are directed to a gravimeter, a gravimeter system and a method for measuring gravitational acceleration within a borehole environment. In a particular embodiment, the gravimeter includes a proof mass that is constrained by a set of springs and an optical interferometer for measuring displacement of the proof mass. The optical interferometer generates a light path from a light source to a reflective surface on the proof mass. When the gravimeter is in the borehole environment, the proof mass is released so that the proof mass moves from a reference position to a position of gravitational equilibrium. Spatial displacement of the proof mass from the reference position to the position of gravitational equilibrium is determined by measuring a change in length of the light path. In turn, gravitational acceleration can be determined from the spatial displacement of the proof mass. By allowing the proof mass to freely move to a position of gravitational equilibrium and determining the displacement of the proof mass using the change in length of the light path, the gravimeter operates in an "open loop." In various embodiments, such an open loop mode of operation facilitates reliable measurement of gravitation acceleration in borehole environments, as compared with conventional gravimeters. Also, in illustrative embodiments, a number of the gravimeters are used in a gravimeter system to make measurements of gravitational acceleration in variety of different directions. Details of various embodiments are discussed below.

Figure 1:
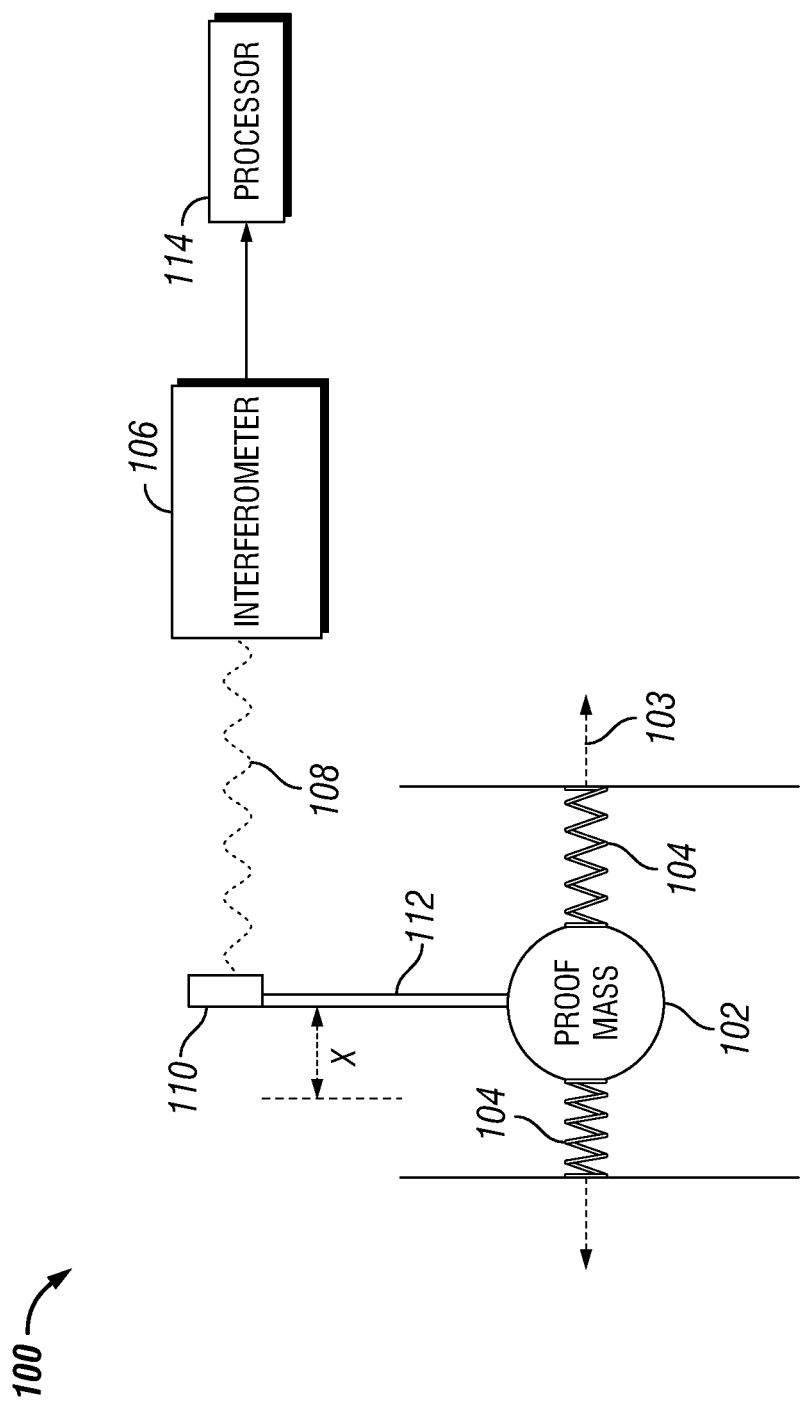
FIG. 1 shows a gravimeter for borehole applications in accordance with one embodiment of the present disclosure.

FIG. 1 shows a gravimeter 100 for borehole applications in accordance with one embodiment of the present disclosure. The gravimeter 100 includes a proof mass 102 that is constrained by a set of spring 104 and that is displaceable in response to gravitational acceleration. As set of springs may include one or more springs. The numeral "x" shows displacement of the proof mass 102 from a central position. Also, as shown in FIG. 1, the proof mass is displaceable along an axis 103. The proof mass 102 has a mass of m that is suspended by the set of springs 104, which have a spring constant of k. In some embodiments, the springs 104 are designed to allow more than ±g equivalent motion of the proof mass 102. g is the acceleration of gravity at the Earth's surface and the value of g varies over the surface of the Earth. On average, the value is 9.8 m/s². ±g equivalent motion provides the proof mass 102 with a large dynamic range of displacement.

The gravimeter 100 also includes an optical interferometer 106 for measuring displacement of the proof mass 102. The optical interferometer 106 generates a light path 108 from a light source (not shown) to a reflective surface 110 on the proof mass 102. The reflective surface 110 is often considered a component of the interferometer 106. The reflective surface 110 acts to reflect the light. In one example, the reflective surface 110 is a mirror. In the embodiment of FIG. 1, the reflective surface 110 is coupled to the proof mass 102 via a mechanical arm 112. In various other embodiments, the reflective surface 110 is directly coupled to the proof mass 102. A substrate can be used to support the optical interferometer 106, while also supporting the proof mass 102 and the set of springs 104. The optical interferometer 106 sensitively measures the displacement of the proof mass 102 under the force of gravity.

In various embodiments, the proof mass 102 is made of a dense material, such as tungsten or lead. The sensitivity of the gravimeter is directly related to the mass of the proof mass. For this reason, in various embodiments, the gravimeter 100 is configured with a heavy proof mass (e.g., 1-2 grams). Specifically, thermo-mechanical noise of the proof mass is proportional to $(k/m)^{1/2}$. A heavier proof mass gives the gravimeter 100 a lower noise floor and a higher sensitivity. As explained above, in some embodiments, the proof mass 102 has a mass of 1-2 grams. In other embodiments, however, a heavier or lighter proof mass can also be used. Similarly, in illustrative embodiments, the springs 104 are compliant and have a small spring constant to provide a low noise floor and a high sensitivity. In various embodiments, the spring constant is within the range of 10 to 100 Newtons/meter.

In illustrative embodiments, the gravimeter is contained within a housing (not shown). In various embodiments the housing has a package size that is no greater than 50 cubic millimeters.

The components of the gravimeter 100, including the proof mass 102 and the springs 104, can be made using a variety of different manufacturing techniques. In some embodiments, the components are made using a conventional macroscopic machining and assembly processes. In other embodiments, the components are made using conventional semiconductor lithography techniques (e.g., from a monolithic piece of material).

The proof mass 102 moves across a range of displacement in response to a local gravitational force that acts upon the proof mass. The displacement of the proof mass 102 can be determined using several different types of optical interferometers 106. Optical interferometers provide measurements that have precision, stability, and repeatability.

Figure 2:
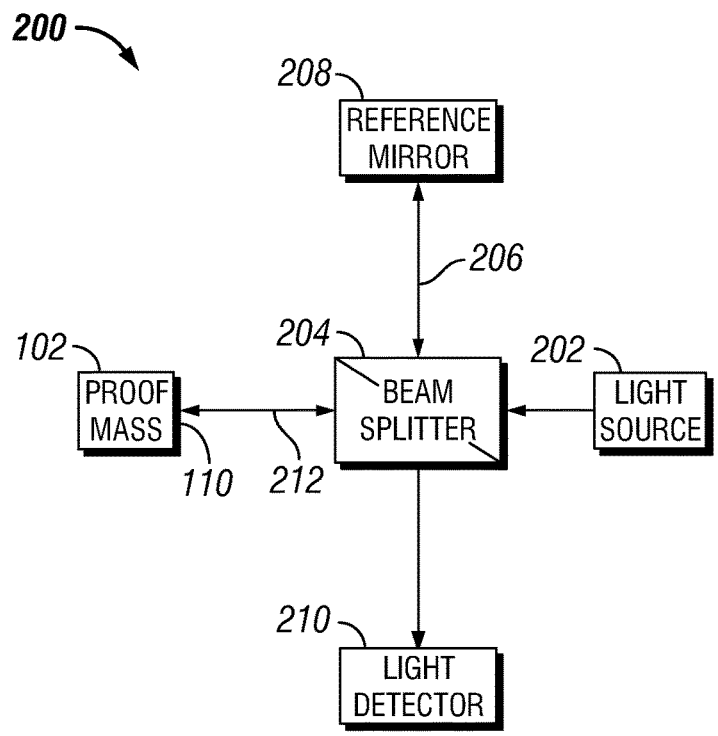
FIG. 2 shows an optical interferometer in accordance with one embodiment of the present disclosure.

FIG. 2 shows an optical interferometer 200 in accordance with one embodiment of the present disclosure. In particular, FIG. 2 shows a Michelson interferometer. The optical interferometer 200 includes a light source 202. In various embodiments, the light source 202 is a wavelength-stable light source, such as a solid state laser diode. The interferometer 200 also includes a light modulator 204, such as a beam splitter or a partial reflecting plate. In FIG. 2, the interferometer 200 includes a beam splitter 204 that splits the light beam into two light components. One of the light components acts as a "reference" component 206 that is reflected from a fixed reference mirror 208 and is transmitted back through the beam splitter 204 onto a light detector 210. The reference component 206 has a fixed path length. The other light component is a "sensing" component 212. The sensing component 212 is part of the light path 108 between the light source 202 and the reflective surface 110 on the proof mass 102. The sensing component 212 reflects from the reflective surface 110 on the proof mass 102 and is further reflected by the beam splitter 204. The sensing component 212 is also detected by the light detector 210. The path length of the sensing component 212 varies as the proof mass 102 moves.

Figure 5:
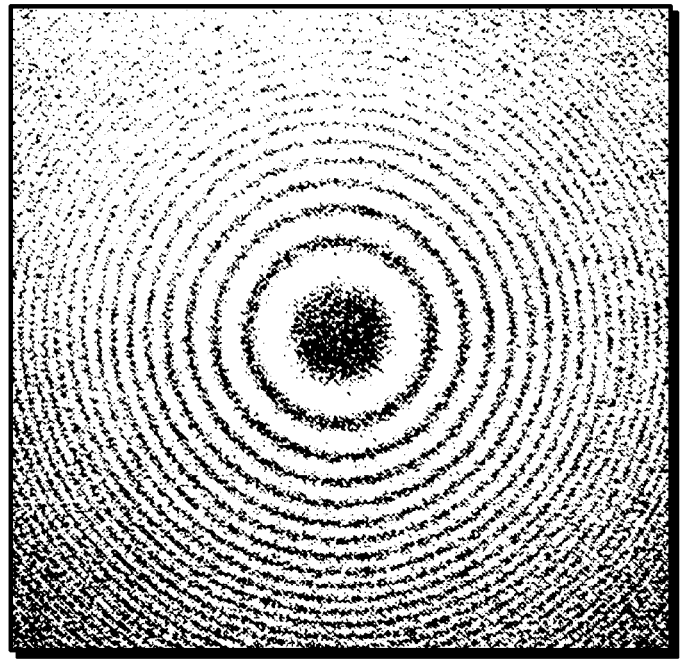
FIG. 5 shows a diffraction pattern for an interferometer that operates in an open loop.

The two light components are detected by the light detector 210. In various embodiments, the light detector 210 is a photo-diode. The difference in the path lengths of the two light components 206, 212 is manifested as a phase shift between the sensing component and the reference component. Depending on this phase shift, the two light components can interfere constructively or destructively and can create a circular diffraction pattern 206, 212 with so-called "interference fringes." FIG. 5 shows a circular diffraction pattern with interference fringes in accordance with one embodiment of the present disclosure.

The path difference (d) can be determined using the following relationship:

$$\lambda = 2d/n \quad (1),$$

where, $\lambda$ is the wavelength of the light and n is the number of interference fringes. By counting the interference fringes of the diffraction pattern, a measure of the path length difference can be determined. The path length difference can be used as a measure of the displacement of the proof mass 102. In turn, this displacement can be used as a measure of local gravitational acceleration.

Figure 3:
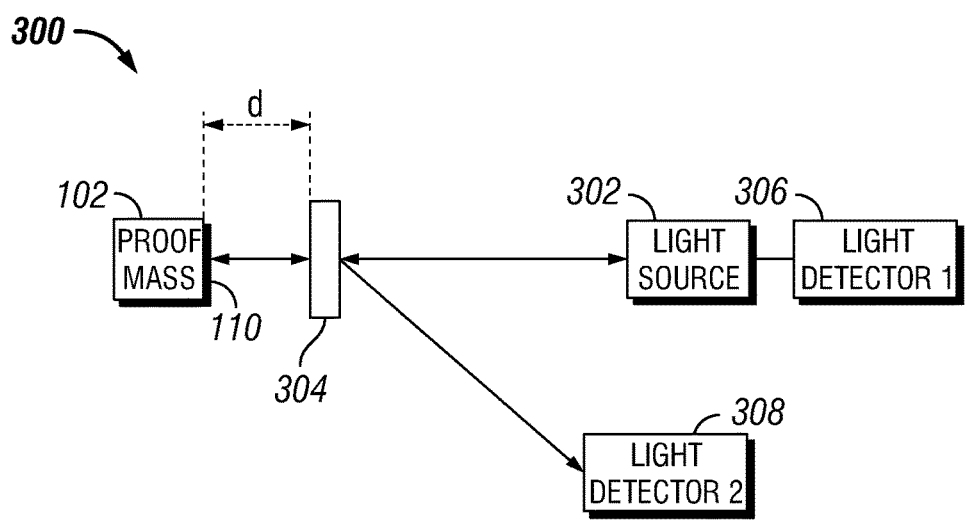
FIG. 3 shows an optical interferometer in accordance with another embodiment of the present disclosure.

Various embodiments of the present disclosure can also use other optical interferometers. FIG. 3 shows an optical interferometer 300 in accordance with another embodiment of the present disclosure. In particular, FIG. 3 shows a diffraction grating optical interferometer 300. The optical interferometer 300 includes a light source 302 and a light modulator 304. In this embodiment, the light modulator is an optical diffraction grating 304. Light is transmitted from the light source 302, through a diffraction grating 304, and reflected back from a reflective surface 110 on the proof mass 102. A portion of the light passes through the diffraction grating 304, reflects from the reflective surface 110 on the proof mass, and passes back through the diffraction grating 304. The light and the diffraction grating interact to produce a diffraction pattern. The additional path length that the light traverses between the grating 304 and the reflective surface 110 results in a relative phase shift. The phase shift is a sensitive function of the variable gap (d) between the diffraction grating 304 and the reflective surface 110 on the proof mass. The variable gap (d) is a part of the light path 108 between the interferometer 106 and the proof mass 102.

For a given gap distance (d) between the diffraction grating 304 and the reflective surface 110, a portion of the light that traverses the diffraction grating will be reflected by the reflective surface 110 and then can (i) be reflected again by the diffraction grating 304, (ii) be diffracted by the diffraction grating, or (iii) pass through the diffraction grating. In the embodiment shown in FIG. 3, a first light detector 306 and a second light detector 308 are positioned at locations to measure both a portion of the light beams that pass through the diffraction grating as well as a portion of the diffracted light beams. In this case, the first detector 306 measures the reflected beams and the second detector 308 measures the diffracted beams. In various embodiments the light detectors 306, 308 are photo diodes. During a measurement, the gap distance (d) is an unknown value. By using the diffraction patterns observed by the two detectors, the gap distance (d) can be determined.

Various embodiments of the diffraction grating optical interferometer 300 have a compact design because the interferometers have a reduced component count. In particular, some embodiments of the diffraction grating interferometer do not use a beam splitter.

Figure 6:
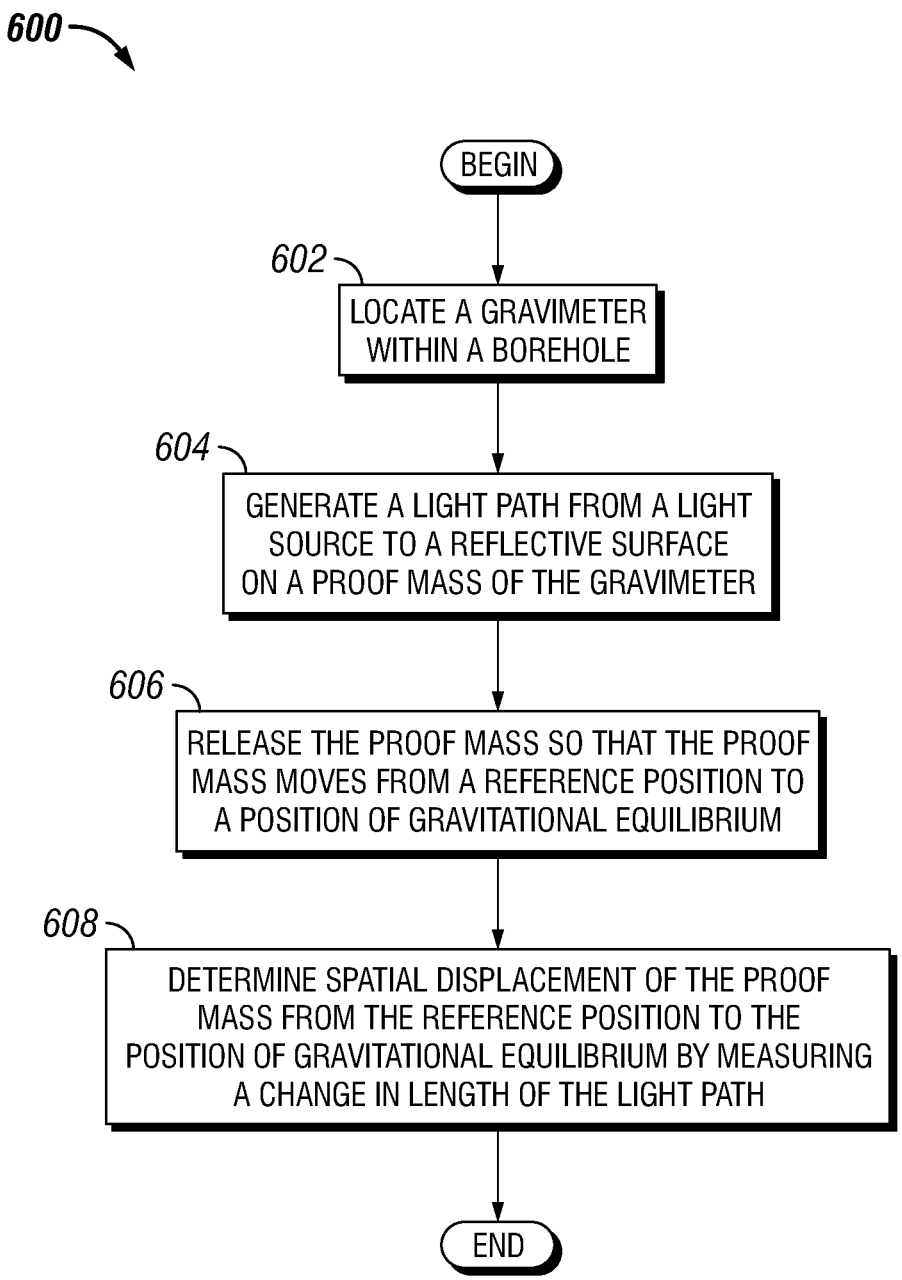
FIG. 6 shows a method for measuring gravitational acceleration in accordance with one embodiment of the present disclosure.

FIG. 6 shows a method 600 for measuring gravitational acceleration in accordance with one embodiment of the present disclosure. The method 600 includes locating a gravimeter within a borehole 602. An example of such a gravimeter is provided within FIG. 1 (e.g., 100). In particular, the gravimeter includes a proof mass that is constrained by a set of springs. A light path is generated from a light source to a reflective surface on the proof mass 604. The proof mass is initially located at a reference position. In some embodiments, the reference position is a position of gravitational equilibrium at a surface location (e.g., the reference position is set before the gravimeter is lowered into the borehole). In other or additional embodiments, the reference position can be at a limit of spatial displacement of the proof mass. For example, the gravimeter can include a mechanical stop that defines the limit of spatial displacement of the proof mass. In various embodiments, the gravimeter includes at least two mechanical stops that define the range of displacement of the proof mass. In one specific example, a first mechanical stop is located at −g and a second mechanical stop is located at +g.

When the gravimeter is in the borehole, the proof mass is released so that the proof mass moves from the reference position to a position of gravitational equilibrium 606. In various embodiments, the proof mass is fixed in place (e.g., at the reference position) using a movable restraining mechanism. In some embodiments, the movable restraining mechanism can include a pin or a hook that mates with the proof mass and fixes the proof mass in place. In alternative or additional embodiments, the movable restraining mechanism includes a clamp with members that secure the proof mass in a fixed position.

The restraining mechanism releases the proof mass from a position, such as the reference position, so that the mass moves to the position of gravitational equilibrium. In alternative or additional embodiments, the restraining mechanism is not used.

Spatial displacement of the proof mass from the reference position to the position of gravitational equilibrium can be determined by measuring a change in length of the light path 608. The change in length of the light path is measured using the optical interferometer.

By allowing the proof mass to freely move to a position of gravitation equilibrium and by determining the displacement of the proof mass using the change in length of the light path, the gravimeter operates in an "open loop." In various embodiments, such an open loop mode of operation facilitates more reliable measurements of gravitational acceleration in borehole environments, as compared with conventional gravimeters. In comparison, often conventional interferometers are configured for a "closed loop" mode of operation. For example, a Michelson interferometer has a "null-point" for wavelength noise. This null point occurs when the path lengths for the sensing light component and reference light component are equal. This null point is the most sensitive position of the interferometer. Accordingly, conventional interferometers use feedback mechanisms to maintain the interferometer close to the null point. In one example, a reference mirror is manually or automatically adjusted using the feedback mechanism so that, as the sensing component path length changes due to a changing displacement, the reference light component path length can be adjusted to keep the path lengths at or close to the null point. In contrast to open loop operation, which determines spatial displacement using a change in length of the light path (e.g., by counting the number of interference fringes between two positions), closed loop operation determines the displacement by using an adjustment distance for the reference mirror. The feedback mechanisms of such conventional interferometers are often unreliable in some environments. For example, one type of feedback mechanism is based on a capacitive measurement. However, some environments, such as borehole environments, are electronically noisy due to the presence of electronic systems. The electronically noisy nature of such environments contaminates the capacitive measurement and makes the displacement measurement unreliable.

Figure 4:
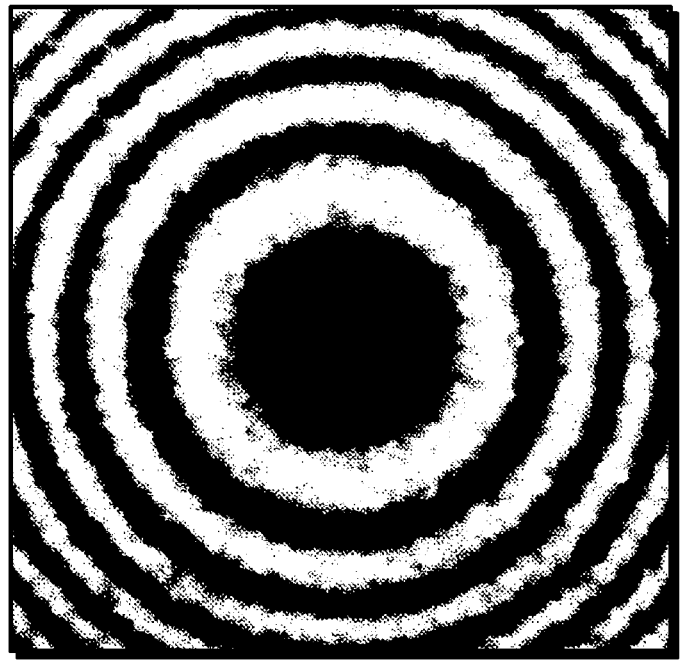
FIG. 4 shows a diffraction pattern for an interferometer that operates in a closed loop.

FIG. 4 shows a diffraction pattern 400 for an interferometer that operates in a closed loop mode. As shown in FIG. 4, the diffraction pattern has few fringes to count because the reference light component is adjusted so that the difference between the two light components is small. In contrast, FIG. 5 shows a diffraction pattern 500 for an interferometer that operates in an open loop.

As explained above, illustrative embodiments of the present disclosure operate in an open loop. In illustrative embodiments of the present disclosure, the reference mirror is fixed and there is no adjustment of the reference mirror using feedback controls and motion actuators. In such configurations, the path length difference between the light components will be substantial and many more interference fringes will appear in the diffraction pattern. To account for this substantial path length difference, various embodiments of the gravimeter are calibrated. The calibration is performed to reference a position of gravitational equilibrium of the proof mass to at least one known fixed position. The position of gravitational equilibrium of the proof mass is the position which is reached when the proof mass is allowed to come to rest under the influence of local gravitational acceleration.

Figure 7:
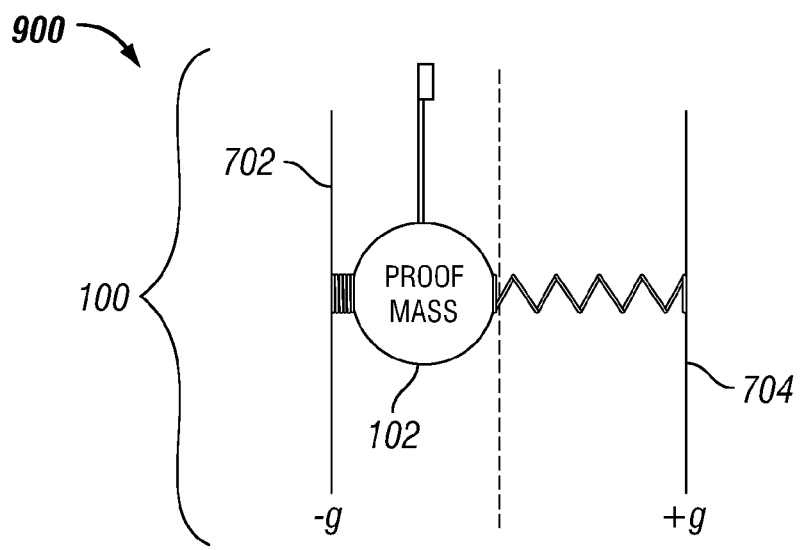
FIGS. 7 and 8 show a method for calibrating the gravimeter in accordance with one embodiment of the present disclosure.
Figure 8:
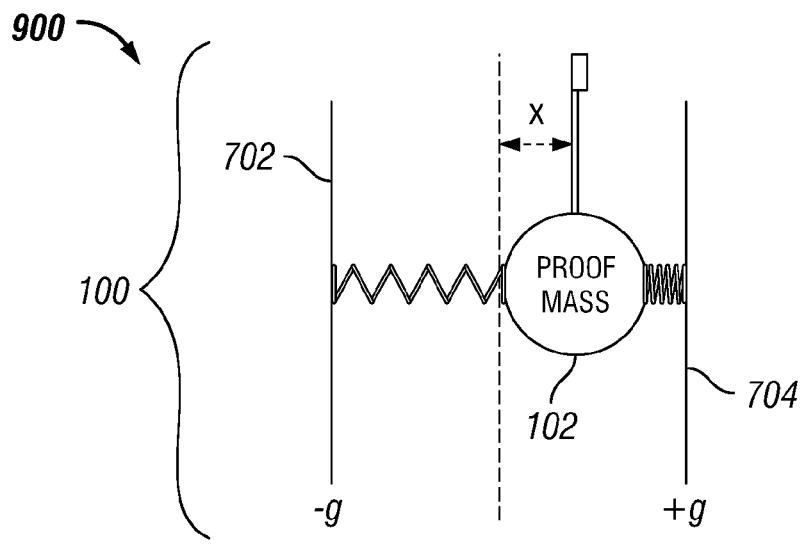

FIGS. 7 and 8 show a method for calibrating the gravimeter 100 in accordance with one embodiment of the present disclosure. In FIG. 7, the proof mass 102 is moved to a first position, which is displaced from a position of gravitational equilibrium of the proof mass. In the embodiment of FIG. 7, the first position is a limit of spatial displacement located at a first mechanical stop 702. The mechanical stop is a fixed known position. In this case, the position corresponds to −g. The proof mass 102 is then moved to a second position that is displaced from the position of gravitational equilibrium. In this case, the proof mass 102 is moved to a second mechanical stop 704 that defines a limit of spatial displacement, which corresponds to +g.

In various embodiments, the proof mass 102 is moved (e.g., to the second mechanical stop) using an actuating mechanism. The actuating mechanism can be coupled physically to the proof mass 102 or coupled to the proof mass using an electro-magnetic force. In illustrative embodiments, the actuating mechanism is driven by, for example, a screw drive, a hydraulic piston, or an electric solenoid.

The spatial displacement of the proof mass 102 from the first position 702 to the second position 704 is determined using the optical interferometer 106 of the gravimeter. The spatial displacement can be determined by measuring the change in length of the light path 108 between the first position 702 and the second position 704 (e.g., determining a number of interference fringes between the first position and the second position). In the embodiments shown in FIGS. 7 and 8, the method of calibration determines a relationship between spatial displacement of the proof mass 102 and gravitational acceleration (e.g., −g and +g). In illustrative embodiments, the method of calibration can be performed before or after a measurement of gravitational acceleration.

Figure 9:
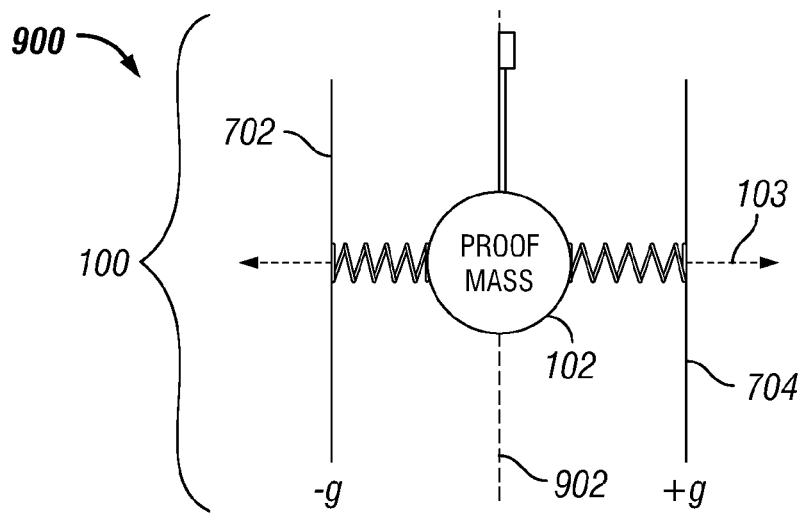
FIG. 9 shows a measurement of gravitational acceleration in accordance with one embodiment of the present disclosure.

FIG. 9 shows a measurement of gravitational acceleration 900 in accordance with one embodiment of the present disclosure. In the embodiment shown in FIG. 9, the proof mass is released so that the proof mass moves from a reference position 704 to a position of gravitational equilibrium 902. In this case, the reference position is +g, which is defined by the mechanical stop 704 and which is the position of the proof mass after the calibration process is completed in FIGS. 7 and 8. The displacement of the proof mass 102 from the reference position (e.g., +g) is determined using the optical interferometer 106. The local gravitational acceleration can be determined by using the displacement of the proof mass 102 and the relationship between gravitational acceleration and spatial displacement of the proof mass. This relationship is determined using, for example, the calibration process shown in FIGS. 7 and 8. In one embodiment, the gravimeter has a linear relationship between spatial displacement of the proof mass and gravitational acceleration. In such an embodiment, if the proof mass has a point of equilibrium at the reference position, then the local gravitation acceleration is +g along the axis 103 of the gravimeter. In another example, if the proof mass moves to a point of equilibrium precisely between −g and +g, then the local gravitation acceleration is 0 along the axis 103 of the gravimeter.

In another embodiment, a gravitational acceleration measurement is made using a gravimeter with a diffraction grating. In one such embodiment, the reference position of the proof mass is a position where a diffraction pattern is observed with reflected light beams and without diffracted light beams (e.g., $d=\lambda/2$). In this case, the first light detector 306 detects the reflected light beams, while the second light detector 308 is not exposed to diffracted light beams. The proof mass is then released and moves to a position of gravitational equilibrium. As the proof mass moves, the number of interference fringes between the reference position and the equilibrium position is determined. The number of interference fringes, in turn, can be used to determine the spatial displacement of the proof mass.

As shown in FIG. 1, illustrative embodiments of the gravimeter 100 include a processor 114 that is coupled to the interferometer 106 and is used to determine spatial displacement of the proof mass 102. In one illustrative embodiment, the processor 114 includes a computer system that is coupled to the interferometer 106. The computer system can include a computer processor and a memory. The processor 106 is used to calculate the spatial displacement of the proof mass 102. In a particular embodiment, the processor 106 determines spatial displacement of the proof mass 102 from a reference position to a position of gravitational equilibrium by measuring a change in length of a light path 108 between the reflective surface 110 on the proof mass and the optical interferometer 106. The change in length of the light path can be measured by counting the number of interference fringes between a first position (e.g., the reference position) and a second position (e.g., the position of gravitational equilibrium). The number of interference fringes, in turn, can be used to determine the spatial displacement of the proof mass between the first position (e.g., the reference position) and the second position (e.g., the position of gravitational equilibrium).

To this end, in various embodiments, the processor 114 receives an output signal from the interferometer 106 that characterizes the displacement of the proof mass 102. In various embodiments, the output signal is received over a period of time and the output signal has a varying amplitude. In one specific embodiment, the interference fringes are represented within the output signal as peaks in the amplitude. As the output signal is received at the processor, the processor identifies the peaks in the amplitude and counts the number of interference fringes. As explained above, in an open loop embodiment, the path difference between the light components will include many interference fringes. For example, with a displacement of 50 microns and a laser diode light wavelength between 500 and 1000 nm, several hundred interference fringes could result and are counted by the processor 106.

In one specific embodiment, the processor 106 is configured to operate in a coarse mode of operation and a fine mode of operation. In the coarse mode of operation, the processor 106 counts an integer number of interference fringes. As the proof mass 102 reaches an equilibrium position, the processor 106 then switches to a fine mode of operation. At this point, the processor 106 uses a higher resolution to determine a fractional value for a final fringe (e.g., the final interference fringe is the fringe at which the proof mass stops). The position of gravitational equilibrium can be located at fringe maxima, fringe minima, or anywhere in between. The final fringe count will include an integer number of fringes as well as some fractional part of the final fringe. In one embodiment, the gravimeter 100 measures gravitational acceleration with a precision of at least 1 microGal. To achieve such precision, the gravimeter 100 has displacement sensitivity on the order of $10^{-14}$ m. In turn, to achieve this sensitivity, the fractional value of the final fringe is determined to a part in $10^{-8}$. In some cases, the proof mass 102 will oscillate at the position of gravitational equilibrium. For example, the proof mass 102 might stop, move back toward the reference position, stop again and then move away from the reference position. In such an instance, the processor 114 can determine the displacement of each oscillation and determine the average displacement of the proof mass 102 from the reference position. In some embodiments, the reference mirror 208 or the proof mass 102 may be finely moved (e.g., "dithered") from the position of gravitational equilibrium so that the processor 106 can better resolve the final fringe and more precisely determine the fractional value for the final fringe.

In illustrative embodiments, the number of interference fringes can be used to determine the spatial displacement of the proof mass between a first position (e.g., the reference position) and a second position (e.g., the position of gravitational equilibrium). For example, the processor 114 can determine spatial displacement of the proof mass by using equation 1. In particular, the processor 114 solves for path difference (d) using known values for the wavelength of light and the measured number of interference fringes (e.g., $d=n\lambda/2$).

Various embodiments of the present disclosure are also directed to a processor 114 that determines a measure of local gravitational acceleration based upon the displacement of the proof mass. For example, in illustrative embodiments, the processor 114 determines the local gravitational acceleration based upon (i) the measured displacement of the proof mass and (ii) the known relationship between spatial displacement of the proof mass and gravitational acceleration. The known relationship between spatial displacement of the proof mass and gravitational acceleration can be determined by the calibration process in FIGS. 7 and 8. This relationship can be saved in the memory of the processor 114 and recalled to determine gravitation acceleration.

Figure 10:
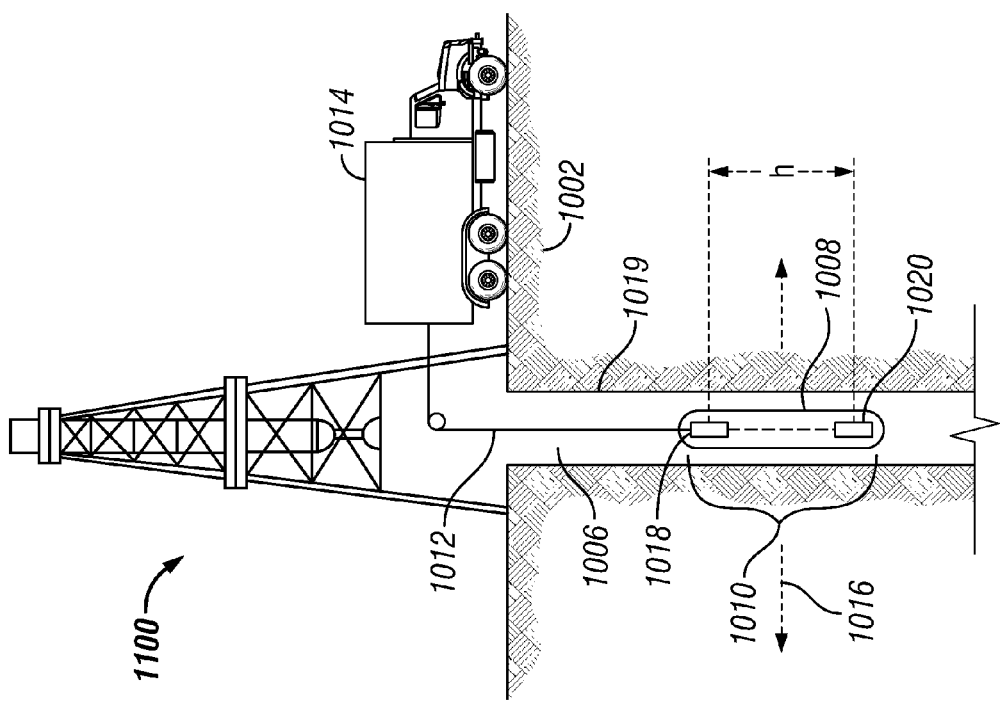
FIG. 10 shows a borehole logging system for evaluating a formation in accordance with one embodiment of the present disclosure.

Illustrative embodiments of the present disclosure are directed to oil field and gas field borehole applications. FIG. 10 shows a borehole logging system 1000 for evaluating a formation 1002 in accordance with one embodiment of the present disclosure. The borehole logging system 1000 is used to investigate, in situ, an earth formation 1002 surrounding a borehole 1006 that traverses the formation. In illustrative embodiments, the borehole logging system 1000 determines a characteristic of the formation 1002 (e.g., density of the formation).

In the embodiment of FIG. 10, the borehole logging system 1000 is a wireline system. The wireline system 1000 includes a borehole logging tool 1008, which, as shown in FIG. 10, is a wireline tool. The wireline tool 1008 includes a gravimeter system 1010 with a first set of gravimeters 1018 and a second set of gravimeters 1020 that are separated by a distance (h). The wireline tool 1008 is disposed within the borehole 1006 and suspended on an armored cable 1012. A length of the cable 1012 determines the depth of the wireline tool 1008 within the borehole 1006. In some embodiments, a retractable arm (not shown) is used to press the wireline tool 1008 against a borehole wall 1019.

The wireline system 1000 includes surface equipment 1014 for supporting the wireline tool 1008 within the borehole 1006. As shown in FIG. 10, the surface equipment 1014 is incorporated into a truck. The surface equipment 1014 includes a mechanism at the surface, such as a drum and winch system for controlling the length of cable 1012. In various embodiments, the surface equipment 1014 includes a power supply for providing electrical power to the wireline tool 1008. The surface equipment 1014 also includes an operator interface for communicating with the wireline tool 1008. In some embodiments, the wireline tool 1008 and operator interface communicate through the armored cable 1012. Although the wireline tool 1008 is shown as a single body in FIG. 10, the tool may alternatively include separate bodies.

Figure 11:
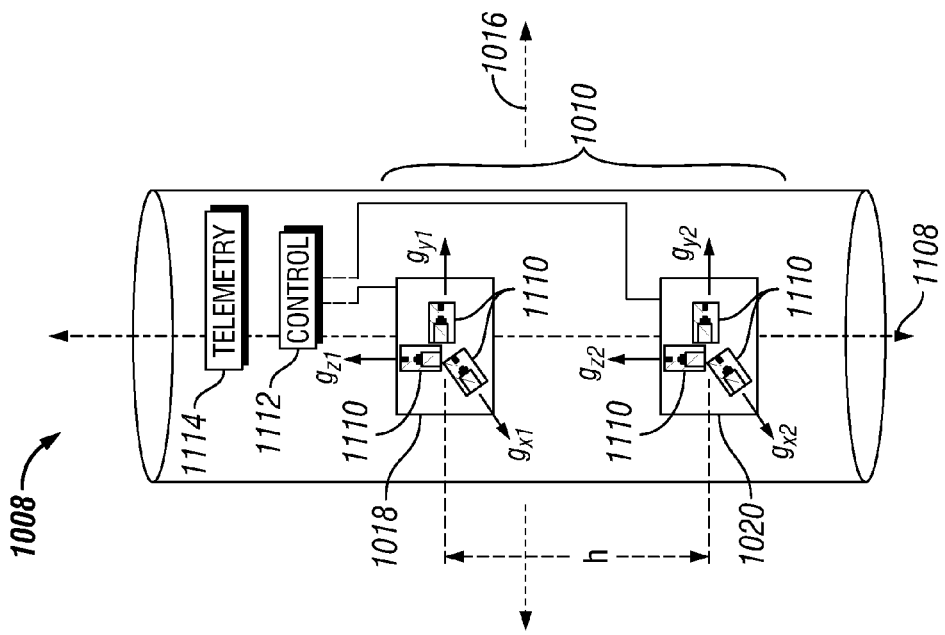
FIG. 11 shows a wireline tool in accordance with one embodiment of the present disclosure.

FIG. 11 shows the wireline tool 1008 in further detail. As explained above, the wireline tool 1008 includes the gravimeter system 1010. The gravimeter system 1010 includes the first set of gravimeters 1018 and the second set of gravimeters 1020. In some embodiments of the present disclosure, the gravimeter system 1010 includes more than two sets of gravimeters. The first set of gravimeters 1018 includes a plurality of gravimeters 1110 (e.g., 2, 3, 5) oriented to detect gravitational acceleration in at least two different directions (e.g., 2, 3, 5). The second set of gravimeters 1020 also includes a plurality of gravimeters 1110 oriented to detect gravitational acceleration in at least two different directions. FIGS. 1-9 provide examples of gravimeters that can be used by the gravimeter system 1010 (e.g., gravimeter 100). Other types of gravimeters may also be used.

In the embodiment shown in FIG. 11, each set of gravimeters 1018, 1020 includes three gravimeters 1110 and the gravimeters are oriented to detect gravitational acceleration in three different directions. In particular, the three different directions are orthogonal directions (e.g., x, y and z). A set of gravimeters aligned in three different directions is referred to herein as a "tri-axial set." In one particular embodiment, a first gravimeter 1110 is aligned with a longitudinal axis 1108 of the wireline tool 1008 (e.g., z-direction), while the other two gravimeters are orthogonal to the first gravimeter and to each other (e.g., x-direction and y-direction).

The first set of gravimeters 1018 and the second set of gravimeters 1020 are longitudinally spaced apart from each other by a known distance (h). In some embodiments, this known distance can be between 1 m and 10 m. In the embodiment shown in FIG. 11, the first set of gravimeters 1018 and the second set of gravimeters 1020 are aligned with the longitudinal axis 1108 of the wireline tool 1008. In various other embodiments, however, the sets of gravimeters 1018, 1020 are not aligned along the same axis.

The distance between the two sets of gravimeters (h) determines (i) the resolution of the gravimeter system 1010 in a longitudinal direction 1108, (ii) the measurement accuracy of the system, and/or (iii) the distance of the sensitivity of the system into the formation (e.g., a lateral distance 1016 into the formation). This lateral distance 1016 into the formation is called the radius of investigation (ROI). In various embodiments, the measurement accuracy is approximately equal to 0.03/h and 90% of the ROI is approximately equal to 5 h. As the value of h decreases, longitudinal resolution increases, while accuracy and depth of investigation decrease. As the value of h increases, the radius of investigation proportionally improves, while the longitudinal resolution decreases. Table 1 shows various longitudinal resolutions, ROIs, and accuracies for an illustrative gravimeter system that uses gravimeters with accuracies of 3 μGal.

TABLE 1

| Longitudinal Resolution (meter) h | 90% ROI (meter) 5h | Accuracy (gram/cc) 0.03/h |
|---|---|---|
| 1 | 5 | 0.03 |
| 2 | 10 | 0.015 |
| 3 | 15 | 0.010 |

As shown in FIG. 11, the wireline tool 1008 also includes a control unit 1112 that is in communication with the gravimeter system 1010. In particular, the control unit 1112 is coupled to the first set of gravimeters 1018 and the second set of gravimeters 1020. The control unit 1112 receives output signals from each of the gravimeters 1110. The output signals characterize the displacement of proof masses within each of the gravimeters 1110. The control unit 1112 is also coupled to a telemetry module 1114 so that the wireline tool 1008 can communicate with surface equipment (e.g., surface equipment 1014 in FIG. 10). The control unit 1114 communicates the output signals to the surface equipment. In various embodiments, the surface equipment includes a processor (e.g., a computer system) for interpreting the output signals from each of the gravimeters 1110. FIG. 1 shows an example of such a processor (e.g. processor 114). As explained with reference to FIG. 1, the processor can determine the spatial displacement of proof masses within each of the gravimeters. The spatial displacement, in turn, is used by the processor to determine local gravitational acceleration measured by each of the gravimeters. In additional or alternative embodiments, such processing can also be performed within the control unit 1112, which, in some embodiments, includes a processor for determining spatial displacement of the proof mass and/or determining local gravitational acceleration.

In various embodiments of the present disclosure, the gravimeters 1110 share components of the gravimeter system 1010. In one example, a single light source is used. Light from the light source is multiplexed and used in each of the gravimeters 1110 (e.g., by using fiber optic cables). In another example, a single processor is used to determine spatial displacement of the proof masses in each of the gravimeters 1110.

Illustrative embodiments of the present disclosure are not limited to wireline systems, such as the ones shown in FIGS. 10 and 11. Various embodiments of the present disclosure may also be applied to logging-while-drilling (LWD) systems and operations. For example, in one LWD embodiment, drilling is halted while the gravimeter system performs measurements.

Figure 12:
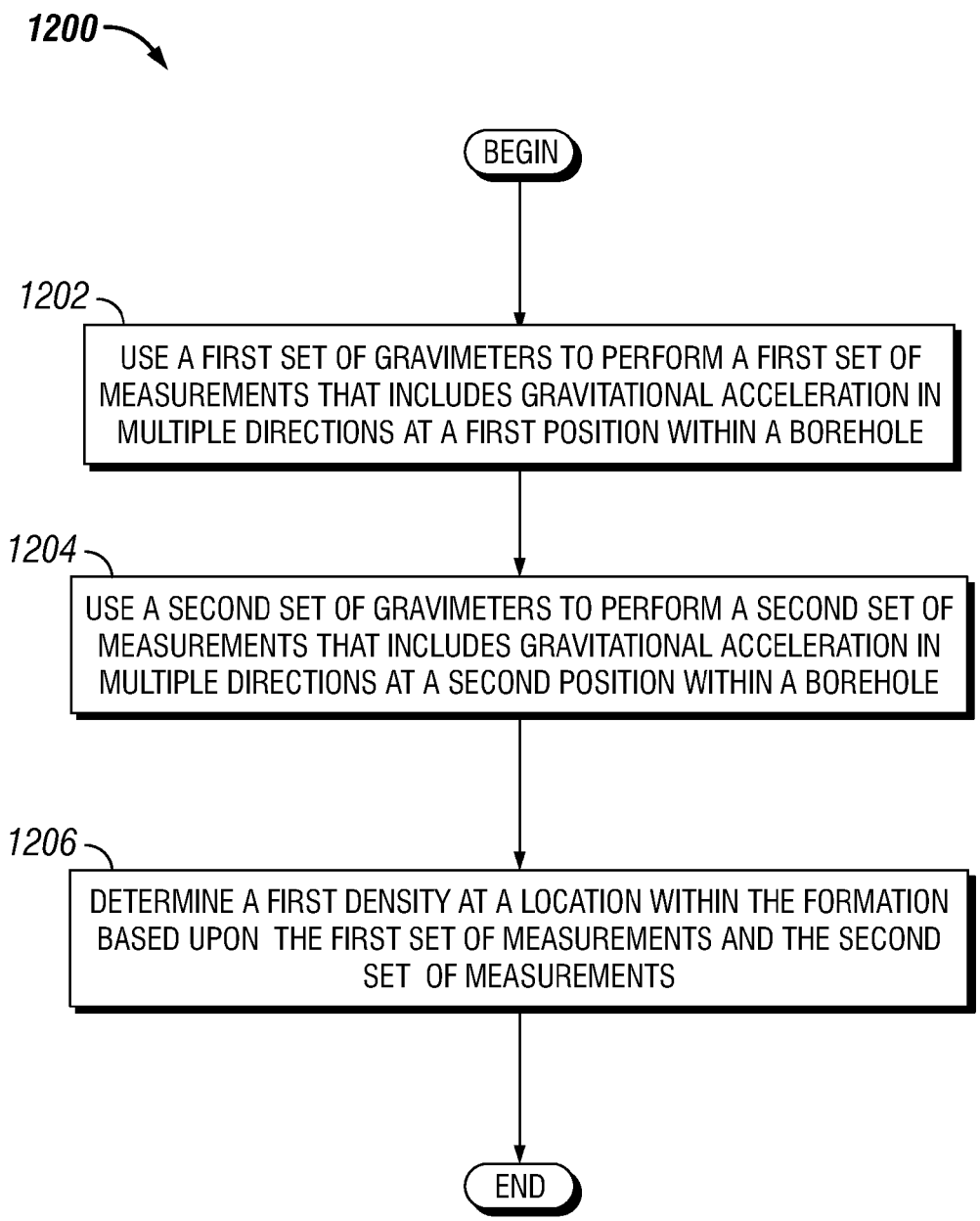
FIG. 12 shows a method for determining a characteristic of a formation in accordance with one embodiment of the present disclosure.

FIG. 12 shows a method 1200 for determining a characteristic of a formation, such as density, in accordance with one embodiment of the present disclosure. In illustrative embodiments, the method 1200 uses a gravimeter system, such as the one described herein (e.g., gravimeter system 1010 in FIG. 11). The method 1200 includes using a first set of gravimeters to perform a first set of measurements at a first position within a borehole 1202. The first set of measurements includes local measurements of gravitational acceleration in at least two different directions (e.g., three-orthogonal directions). A second set of gravimeters is used to perform a second set of measurements at a second position within the borehole 1204. The second set of measurements also includes local measurements of gravitational acceleration in at least two different directions (e.g., three-orthogonal directions). The first position and second position are spaced apart from each other by a known distance. For example, with respect to the wireline tool shown in FIG. 11, the known distance is the distance between the first set of gravimeters and the second set of gravimeters (h). In various embodiments of the present disclosure, a processor uses the measures of local gravitational acceleration to determine a property of the formation, such as density 1206.

In particular, the processor uses at least one local gravitational acceleration measurement at the first set of gravimeters and at least one local gravitational acceleration measurement at the second set of gravimeters to determine a property of the formation, such as density. The processor can determine density of the formation by using, for example, equation 2 below:

$$\rho = \frac{1}{4\pi G}\frac{\Delta g}{h} - \frac{2}{3}\overline{\rho}(h), \tag{2}$$

where h is the distance between the first set of gravimeters and the second set of gravimeters (e.g., 1018 and 1020); ρ is the average formation density over a volume defined by the distance h; G is the universal gravitational constant (6.674 28±0.000 67)·10$^{-11}$ m$^3$/kg s$^2$; Δg is the difference between the local gravitational acceleration measurement at the first set of gravimeters and the local gravitational acceleration measurement at the second set of gravimeters; and $\overline{\rho}$(h) is the mean density of the Earth between (1) the surface of the Earth and (2) the position of the first set of gravimeters (e.g., 1018, 1018), and is conventionally known as the "free air gradient."

In the embodiment shown in FIG. 11, the gravimeter system 1010 provides six measures of local gravitation acceleration at two positions along the borehole from two tri-axial sets 1018, 1020 (e.g., $x_1$, $y_1$, $z_1$, and $x_2$, $y_2$, $z_2$). In this manner, various embodiments of the gravimeter system provide three components of a gravity vector and nine components of the gravity gradient tensor. Equation 3 shows the gravity gradient tensor.

$$\Gamma = \vec{\nabla}\vec{g} = \begin{pmatrix} \partial_x g_x & \partial_x g_y & \partial_x g_z \\ \partial_y g_x & \partial_y g_y & \partial_y g_z \\ \partial_z g_x & \partial_z g_y & \partial_z g_z \end{pmatrix} \tag{3}$$

In various embodiments, the gravity gradient tensor includes five mutually independent components because the gravity field is irrotational. The gravity gradient tensor describes local gravity field information by the curvature of the gravity field. The gravity field is disturbed by the influence of nearby mass anomalies. The lateral components of the tensor (e.g., $\partial_x g_x$ and $\partial_y g_y$) and the cross-gradients (e.g., $\partial_x g_y$ and $\partial_y g_x$) are sensitive to lateral accelerations from mass anomalies in a lateral plane (e.g., direction 1016 in FIGS. 10 and 11). The local gravity vector measured at point r is given by:

$$g(r) = G \iiint \frac{r'-r}{|r'-r|^3} \rho(r') dv', \tag{4}$$

where g is the acceleration due to the force of gravity at a point r, G is the universal gravitational constant, and r' is the position vector of the density source $\rho(r')$. Equation 4 integrates the formation density over the formation volume to determine the mass of the formation, and therefore, the acceleration due to gravity. For a gravimeter measuring gravity along a single arbitrary axis (e.g., $x_1$), equation 4 reduces to the following relationship:

$$g_{x1}(x_1, x_2, x_3) = G \iiint \frac{(x'_1 - x_1)\rho(x'_1, x'_2, x'_3)}{|(x'_1 - x_1)^2 + (x'_2 - x_2)^2 + (x'_3 - x_3)^2|^{3/2}} dv', \tag{5}$$

where ($x_1$, $x_2$, $x_3$) form a local orthogonal Cartesian coordinate system and the primed co-ordinates make up the position vector of the density source $\rho(x', y', z')$. Using equations 4 and 5, the components of the gravity vector measured from an arbitrarily oriented gravimeter, as described herein, can be derived.

The various discrete components of the gravity gradient tensor represent the changes in various components of the gravity vector measured along different axes. For example, for a gravimeter system with two tri-axial sets of gravimeters aligned in orthogonal directions (x, y, and z), and separated by a known distance h, two particular components of the gravity gradient tensor can be calculated as follows:

$$\Gamma_{zz} = \frac{(g_{z2} - g_{z1})}{h}, \tag{6}$$

$$\Gamma_{xy} = \frac{(g_{x2} - g_{y1})}{h}, \tag{7}$$

where $g_{z1}$ is the acceleration due to gravity in the z-direction at the first set of gravimeters; $g_{z2}$ is the acceleration due to gravity in the z-direction at the second set; $g_{y1}$ is the acceleration due to gravity in the y-direction at the first set; $g_{x2}$ is the acceleration due to gravity in the x-direction at the second set; $\Gamma_{zz}$ is the component of the gravity gradient tensor that measures change in gravity along the z-direction between the two sets of gravimeters; and $\Gamma_{xy}$ is the component of the gravity gradient tensor that measures the change in gravity from the x-direction at the second set to the y-direction at the first set. The other components of the gravity gradient tensor will be of similar form. In one example, the processor uses the $\Gamma_{zz}$ component of the gravity gradient tensor along with equation 2 to determine the density of the formation (e.g., $\Delta g = g_{x2} - g_{x1}$, $g_{y2} - g_{y1}$, and/or $g_{z2} - g_{z1}$). In this manner, the processor can determine the density of the formation based on the gravity measurements from the first set of gravimeters and the second set of gravimeters and the known distance between the sets of gravimeters (h).

For gravimeter systems with more than two sets of gravimeters, many more combinations of measurements can be used. For example, gravimeters placed at distances of multiples of h can be combined to provide answer products featuring different longitudinal resolution, depth of investigation, and density accuracy (see Table 1). For n sets of gravimeters, a generalized gravity gradient component ($\Gamma_{n_{x1}m_{x2}}$) for the $n^{th}$ and $m^{th}$ gravimeters separated by n·h, which are oriented along arbitrary $x_1$ and $x_2$ axes, can be determined by:

$$\Gamma_{n_{x1}m_{x2}} = (g^m_{x2} - g^n_{x1})/nh \tag{8}$$

In various embodiments, the density of the earth formation is derived solely from the $\Gamma_{zz}$ component. The other components, however, are useful for other applications, such as flood front monitoring.

Figure 13:
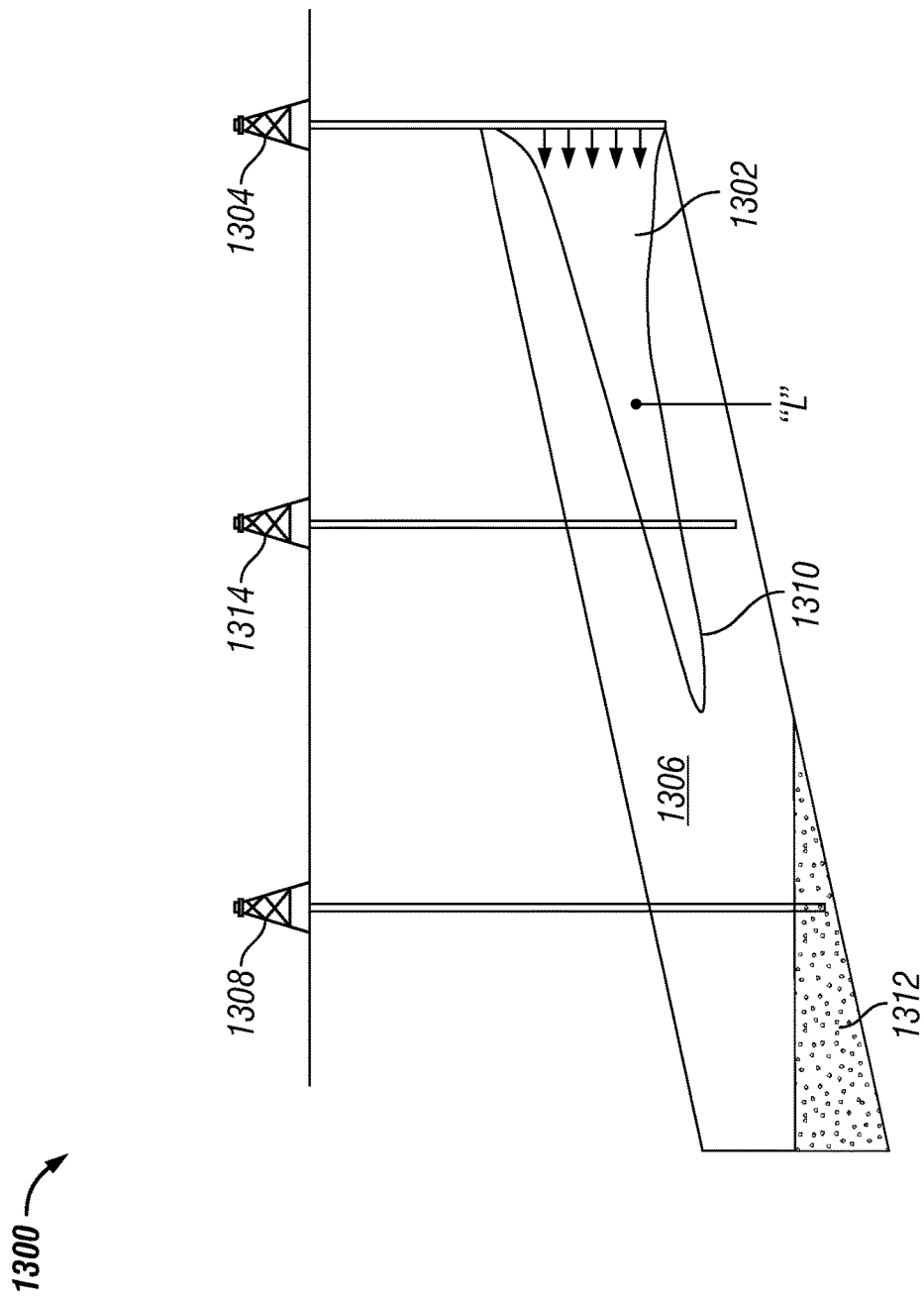
FIG. 13 shows an enhanced oil recovery (EOR) process in accordance with one embodiment of the present disclosure.

Various embodiments of the gravimeter system described herein can be used to monitor fluid movements in formations over time. Such fluid movements can be the result of hydrocarbon reservoir depletion or the result of enhanced oil recovery (EOR). FIG. 13 shows an EOR process 1300 in accordance with one embodiment of the present disclosure. During an EOR process, an injection fluid (e.g., gas or water) 1302 is injected through an injection well 1304 into a reservoir formation 1306 to increase pressure within the reservoir formation and/or to force hydrocarbons toward a production zone 1308. In the specific example shown in FIG. 13, water is used as an injection fluid and is injected into the reservoir formation 1306 through the injection well 1304. The injection fluid 1302 includes a flood front 1310 that moves through a rock matrix within the reservoir formation 1306. The location of the flood front 1310 within the formation is valuable to hydrocarbon producers for many reasons. For example, in many cases, hydrocarbon production is terminated before arrival of the flood front at a production well 1308. In another example, the location of the flood front 1310 is valuable information to know so that injection fluid does not down dip into an oil producing region 1312.

Illustrative embodiments of the present disclosure can be used to detect and track the movement of the flood front 1310 within the formation 1306. To this end, a wireline tool is lowered into a monitoring well 1314. The wireline tool includes, for example, a gravimeter system as described herein (e.g., gravimeter system 1010). As the water moves through the rock matrix of the reservoir formation 1306, there is a large density difference between the rock matrix that contains water and the rock matrix that contains gas. This density difference can be detected and tracked by the gravimeter system. The density difference can be detected by measuring density within the formation at different times. For example, before the injection of water into the injection well 1304, the wireline tool is used to determine a measure of density at a location (L) within the formation 1306. When the injection begins, the wireline tool continues to measure the density at the location (L). The measures of density over time are compared to determine a temporal density change. If there is no density change, then this result suggests that the flood front has not yet reached the location (L). If a density change is measured over time, this result suggests that there is fluid movement at the location (L). If the density change is positive, then this change suggests that a higher density fluid has moved into the location. In FIG. 13, the density change is positive because gas at the location (L) is being replaced with water from the flood front 1310. If the density change is negative, then this change suggests that a lower density fluid has moved into the location. Such a result may indicate, for example, depletion of oil in an oil bearing reservoir.

The density of the formation and the size of the density change depend on the properties of the reservoir formation (e.g., porosity) and the properties of the fluids moving through the formation (e.g., water, oil and gas). In particular, the bulk density of the formation ($\rho_b$) is related to the formation porosity ($\varphi$) by $$\rho_b = \varphi \rho_f + (1-\varphi)\rho_{ma} \qquad (9),$$

where $\rho_f$ is the density of the fluid within the rock pore space and $\rho_{ma}$ is the density of rock matrix. Typical reservoir rock densities are on the order of 2.6-2.9 g/cc. The fluid in the pore space can be filled with (1) oil, which has a density of approximately 0.8 g/cc, (2) with water, which has a density of approximately 1.0 g/cc, or (3) gas, which has a density of approximately 0.2 g/cc. Using equation 9 and appropriate density values, a calculated bulk density change can be determined. This calculated density change can be compared to the measured density change from the gravimeter system. In various embodiments, the comparison of a calculated change to a measured change can be used to detect and track motion of fluid within the formation and can also be used to identify a particular type of fluid movement within the formation. Equation 10 shows an example of a density change calculation for water and gas. For a formation with a porosity of 10 p.u., a calculated bulk density change ($\Delta\rho_b$) can be determined by:

$$\Delta\rho_b = \varphi(\rho_{H2O} - \rho_{gas}) \qquad (10),$$

where $\rho_{H2O}$ is the density of water and $\rho_{gas}$ is the density of gas. In this case, equation 10 provides a density change of 0.08 g/cc. In various embodiments, this value is within the sensitivity of the gravimeter system. The gravimeter system is also useful in other applications. In another example, the gravimeter system is used to monitor the flow of $CO_2$ during a $CO_2$ sequestration process. In such an embodiment, the $CO_2$ is pressurized and also has high density. The high density provides a large density difference and can be tracked by various embodiments of the gravimeter system. The density difference between oil and water is much smaller (e.g., 0.02-0.05 g/cc depending on porosity), but can also be monitored using various embodiments of the gravimeter system described herein.

Figure 14:
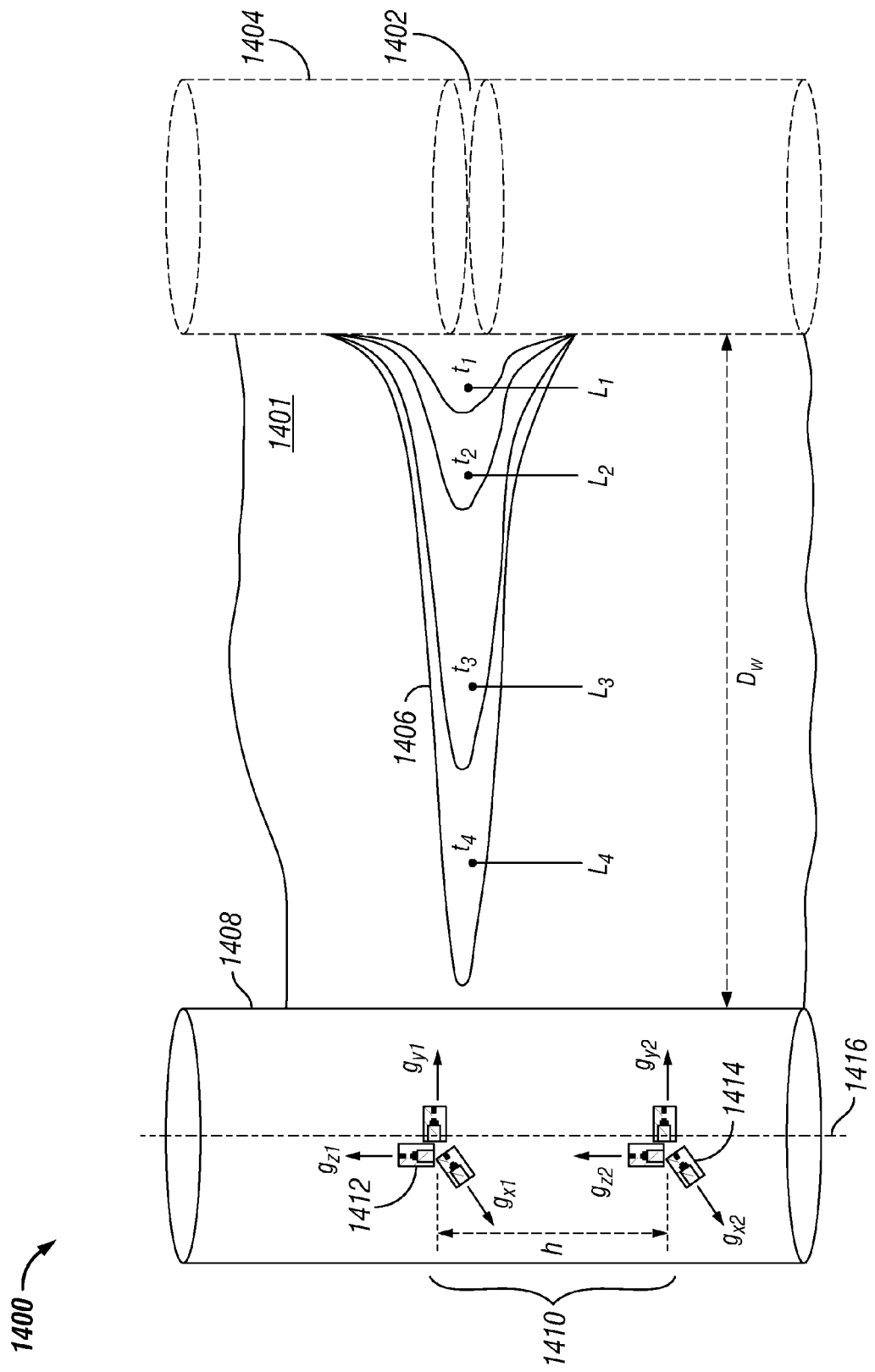
FIG. 14 shows an EOR process in accordance with another embodiment of the present disclosure.

FIG. 14 shows an EOR process 1400 in accordance with another embodiment of the present disclosure. In this embodiment, water is injected into a formation 1401 through an injection zone 1402 within an injection well 1404. In various embodiments, the injection zone 1404 has a depth of 1 to 10 meters. The movement of the water (e.g., flood front 1406) is monitored from a monitoring well 1408. In various embodiments, the distance ($D_w$) between the monitoring well and the injection well is between 100 meters to 1000 meters. The monitoring well 1408 includes a gravimeter system 1410, such as the gravimeter system shown in FIG. 11 (e.g., 1010). In some embodiments, the gravimeter system 1410 is permanently installed within the monitoring well 1408. In additional or alternative embodiments, the gravimeter system 1410 is periodically lowered down the monitoring well 1408 using a wireline tool. During the injection process, the flood front 1406 moves through the formation 1401 towards the monitoring well 1408. The injection process can progress for months or years. Over this time period, the gravimeter system 1410 makes density measurements within the formation. By comparing the density measurements and determining density changes at each location, the progress of the flood front 1406 at locations $L_1$, $L_2$, $L_3$ and $L_4$ can be monitored over time. In particular, the arrival of the flood front 1406 at each of times $t_1$, $t_2$, $t_3$, $t_4$ can be determined. A discrete time monitoring interval for the gravimeter system can range between 10 days to 1000 days (e.g., time period between comparisons).

As described above, gravimeter systems with different longitudinal distances (h) yield density measurements with different radii of investigation. In the embodiment shown in FIG. 14, as the injection process begins, a large distance between sets of gravimeters (h), 1412, 1414 is used so that the gravimeter system 1410 has a large ROI. The large ROI allows the gravimeter system 1410 to monitor location $L_1$. Once the flood front reaches location $L_1$ at time $t_1$, the longitudinal distance (h) between the sets of gravimeters is decreased so that the system yields more accurate measurements of location $L_2$. As the flood front approaches the monitor well, the longitudinal distance (h) between the sets of gravimeters 1412, 1414 is further decreased so that the system yields more accurate measurements at locations $L_3$ and $L_4$. In such an embodiment, the distances between the sets of gravimeters (h) 1412, 1414 can be modified by selecting specific sets of gravimeters from an array of sets that are, for example, aligned along a longitudinal axis of a borehole 1416 or a longitudinal axis of the wireline tool (e.g., longitudinal axis 1108 in FIG. 11). In additional or other embodiments, the distance (h) can be modified by moving the gravimeter system 1410 to different locations along the length of the borehole 1408.

In the examples shown in FIGS. 13 and 14, the change in formation density occurs along a direction orthogonal to the borehole axis 1416 of the monitoring well 1408. In such cases, the lateral components of a gravity gradient tensor (e.g., $\partial_x g_x$ and $\partial_y g_y$) are most sensitive to the changes in formation density. However, illustrative embodiments of the gravimeter system can also be used in other circumstances. For example, the gravimeter system can also be used to make measurements in a deviated monitor well. In another example, the gravimeter system can be used to make measurements when the flood front is approaching the deviated monitor well from an arbitrary angle. By lowering the gravimeter on a wireline tool through the formation or using an array of stationary sensors, a location of the moving flood front can be detected by the various components of the gravity gradient tensor.

Illustrative embodiments of the present disclosure provide for improved measurement of gravitational acceleration in a borehole environment. In various embodiments, the gravimeter described herein uses a large proof mass, an optical interferometer, and an open loop mode of operation to reduce noise and achieve precision on the order of 1 μGal. Also, such a design helps ensure measurement repeatability between different gravimeters. In contrast, many conventional gravimeters suffer from insufficient sensitivity and lack measurement repeatability. Such conventional interferometers use small proof masses and/or use noise-prone methods for displacement measurement (e.g., a capacitive measurement).

Various embodiments of the gravimeter described herein also include other features that facilitate deployment of the gravimeter in a borehole environment. For example, the ability to multiplex light from a single light source to each of the gravimeters reduces cost and complexity in borehole gravimeter systems. Also, the small package size of some gravimeter embodiments facilitates use of many gravimeters in a borehole gravimeter system. In turn, a gravimeter system with many gravimeters can be used to make gravity measurements in a variety of different directions. As explained above, in one example, tri-axial sets of gravimeters are arranged at a given location on a tool string to furnish a 3-dimensional gravity measurement ($g_x$, $g_y$, $g_z$). In a more specific embodiment, a plurality of tri-axial sets that are separated by a distance (h) allows the gravimeter system to make gradiometric measurements in many different directions (e.g., measurement of the full gravity gradient tensor). In contrast, many conventional gravimeter systems use a single gravimeter to make gravimeter measurements because measurements are not repeatable between different conventional gravimeters. Also, using such conventional systems, gravity measurements are made in a single vertical direction and a gimbaling system is used to align the gravimeter along the vertical direction.

The term "processor" should not be construed to limit the embodiments disclosed herein to any particular device type or system. As explained above, the processor may include a computer system. The computer system may include a computer processor (e.g., a microprocessor, microcontroller, digital signal processor or general purpose computer). The computer system may also include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCM-CIA card), or other memory device.

Any of the methods and processes described above, including processes and methods for (i) determining spatial displacement of a proof mass, (ii) determining gravitational acceleration based upon spatial displacement, (iii) determining a density at a location within a formation, and (iv) determining a density difference within a formation over time, can be implemented as computer program logic for use with the computer processor.

The computer program logic may be embodied in various forms, including a source code form or a computer executable form. Source code may include a series of computer program instructions in a variety of programming languages (e.g., an object code, an assembly language or a high-level language such as C, C++ or JAVA). Such computer instructions can be stored in a computer readable medium (e.g., memory) and executed by the computer processor.

Furthermore, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although several example embodiments have been described in detail above, those skilled in the art will readily appreciate that many modifications are possible in the example embodiments without materially departing from the scope of this disclosure. Accordingly, such modifications are intended to be included within the scope of this disclosure.

What is claimed is:

1. A method for measuring gravitational acceleration, the method comprising:
   locating a gravimeter within a borehole, wherein the gravimeter includes a proof mass that is constrained by at least one spring, an open loop optical interferometer having a reference component located in a fixed position relative to the proof mass, and a light source, with said proof mass allowed to freely move against the spring to a position of gravitational equilibrium without feedback;
   generating a light path from the light source to a reflective surface on the proof mass; and
   determining spatial displacement of the proof mass from a reference position of the reference component to a position of gravitational equilibrium by (i) determining a number of interference fringes between the reference position and the position of gravitational equilibrium with the open loop optical interferometer, and (ii) determining a change in length of the light path based on the number of interference fringes.

2. The method according to claim 1, wherein the determining the change in length of the light path based on the number of interference fringes includes finding the change according to $\lambda=2d/n$, where $\lambda$ is the wavelength of light traversing the light path, d is the change in length, and n is the number of interference fringes between the reference position and the position of gravitational equilibrium found by the optical interferometer.

3. The method of claim 1, further comprising:
   releasing the proof mass so that the proof mass moves from a reference position to a position of gravitational equilibrium.

4. The method according to claim 1, further comprising:
   determining gravitational acceleration based upon the spatial displacement.

5. The method according to claim 4, wherein the reference position is a position of gravitational equilibrium at a surface location.

6. The method according to claim 4, wherein the reference position is a position of the proof mass at a limit of spatial displacement.

7. The method of claim 1, further comprising:
   moving the proof mass to a first position, wherein the first position is displaced from a position of gravitational equilibrium of the proof mass;
   moving the proof mass to a second position, wherein the second position is displaced from the position of gravitational equilibrium of the proof mass;
   determining spatial displacement of the proof mass from the first position to the second position.

8. The method of claim 7, wherein the proof mass has a first limit of spatial displacement and a second limit of spatial displacement.

9. The method of claim 8, wherein the first position is at the first limit and the second position is at the second limit.

10. A gravimeter comprising:
    a proof mass that is constrained by at least one spring and that is displaceable in response to gravitational acceleration;
    an open loop optical interferometer for measuring displacement of the proof mass without feedback, wherein the optical interferometer comprises a reference component in a fixed position relative to said proof mass and a light source and is configured to generate a light path from the light source to a reflective surface on the proof mass; and
    a processor in electronic communication with the optical interferometer, wherein the processor is configured to determine spatial displacement of the proof mass from a reference position of said reference component to a position of gravitational equilibrium by (i) determining a number of interference fringes between the reference position and the position of gravitational equilibrium and (ii) determining a change in length of the light path based on the number of interference fringes.

11. The gravimeter according to claim 10, wherein the processor is further configured to determine gravitational acceleration based upon the spatial displacement.

12. The gravimeter according to claim 10, wherein the optical interferometer further comprises:
a light detector for detecting the light path.

13. The gravimeter according to claim 12, wherein the optical interferometer further comprises:
a light modulator configured to split the light path into two or more light components.

14. The gravimeter according to claim 13, wherein the light modulator is a beam splitter.

15. The gravimeter according to claim 13, wherein the light modulator is an optical grating.

16. A borehole tool comprising:
a first set of gravimeters according to claim 10, wherein the first set includes a plurality of gravimeters oriented to detect gravitational acceleration in at least two different directions;
a second set of gravimeters according to claim 10, wherein the second set includes a plurality of gravimeters oriented to detect gravitational acceleration in at least two different directions; and
wherein the first set of gravimeters and the second set of gravimeters are spaced apart from each other by a known distance.

17. The tools according to claim 16, wherein the tool includes a longitudinal axis and the first set of gravimeters and the second set of gravimeters are aligned with the longitudinal axis.

18. The tool according to claim 16, wherein the tool comprises greater than two sets of gravimeters.

19. The tool according to claim 16, wherein the first set of gravimeters includes at least three gravimeters oriented to detect gravitational acceleration in at least three different directions and the second set of gravimeters includes at least three gravimeters oriented to detect gravitational acceleration in at least three different directions.

20. The tool according to claim 19, wherein the at least three different directions are orthogonal directions.

21. The tool according to claim 16, further comprising:
a processor configured to determine a density at a location using a first gravitational acceleration measurement at the first set of gravimeters and a second gravitational acceleration measurement at the second set of gravimeters.

22. The tool according to claim 21, wherein the processor is configured to determine the density at the location within the formation using the known distance between the first set of gravimeters and the second set of gravimeters.

23. A method for determining a characteristic of a formation, the method comprising:
using a first set of gravimeters according to claim 10 to perform a first set of measurements that includes gravitational acceleration in at least two different directions at a first position within a borehole;
using a second set of gravimeters according to claim 10 to perform a second set of measurements that includes gravitational acceleration in at least two different directions at a second position within the borehole, wherein the first position and second position are spaced apart from each other by a known distance; and
determining a first density at a location within the formation using the first set of measurements and the second set of measurements.

24. The method according to claim 23, wherein the density is determined using the known distance between the first location and the second location.

25. The method according to claim 23, wherein the first set of measurements includes gravitational acceleration in at least three different directions at the first position within the borehole and the second set of measurements includes at least three different directions at the second position within the borehole.

26. The method according to claim 25, wherein the at least three different directions are orthogonal directions.

27. The method according to claim 23, further comprising:
using the first set of gravimeters and the second set of gravimeters to determine a second density at the location within the formation, wherein the first density and the second density are measures of density at different times within the location.

28. The method according to claim 27, further comprising:
comparing the first density to the second density to determine a density change within the location over time.

29. The method according to claim 28, further comprising:
using the density change within the location over time to monitor a flood front.

* * * * *